2,963,511
QUATERNARY AMMONIUM-ETHER COMPOUND

Henri Morren, Forest-Brussels, Belgium, assignor to Union Chimique Belge, Societe Anonyme, Brussels, Belgium, a company of Belgium No Drawing. Filed July 5, 1957, Ser. No. 669,978

Claims priority, application Belgium May 7, 1952

1 Claim. (Cl. 260—567.6)

This invention relates to compounds of the general formula

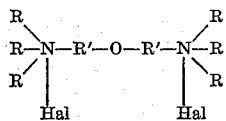

and to methods for their preparation. In the above formula,

R is an alkyl group with 1–3 carbon atoms,
R' is an alkyl group with 4–6 carbon atoms, and
Hal is chlorine, bromine or iodine.

Compounds corresponding to the above formula are effective for use in surgery to obtain relaxation of the muscles, i.e. they are effective as curarizing agents. More particularly, compounds of the above formula are quick-acting curarizing agents having very low toxicity which makes them highly effective for use in numerous common surgical operations such as appendectomy, surgical treatment of ordinary hernia, hysterectomy, and the like. The compounds of the above formula effectively paralyze the peripheral muscles but leave the respiratory muscles untouched. These compounds are free from undesirable effects such as a histaminic effect which hampers respiration, a muscarinic effect which produces salivary secretions and they are also free from nicotinic action.

Compounds of the above formula are suitable prepared by first reacting an alpha, omega-alkyldiol containing the R' group, or the corresponding monosodium derivative, with an excess of an alpha, omega-dihalogenoalkane containing the R' group, treating the resulting omega-halogeno, omega'-hydroxy-dialkyl ether with a hydrogen halide acid, and quaternizing the omega-omega'-dihalogeno-dialkyl ether thus obtained by heating with an excess of an alkylamine.

When preparing the iodine derivatives, it is advantageous to prepare them by reacting an alkali iodide with the dichloro-dialkyl ether, or with the dichloride of the omega-omega'-bis(trialkylammonium)-dialkyl ether or with the corresponding bromine derivatives.

For quaternizing the omega, omega'-dihalogeno-dialkyl ether a trialkylamine containing the R group, for example trimethylamine, is suitably used, if it is desired to obtain compounds of the above mentioned formula in which all the R groups are identical. However, compounds having R groups of different kinds can be prepared if a dialkylamine, for example diethylamine, is reacted with the ether and if the resulting omega, omega'-dialkylamino-dialkyl ether is then quaternized with an alkyl monohalide having a different alkyl group, for example a methyl monohalide.

The following specific examples are further illustrative of the preparation of compounds of the above formula.

Example 1.—Dibromide of 5,5'-bis(trimethylammonium)-dipentyl ether

Fourteen grams of sodium are dissolved in 310 mg. of 1,5-pentanediol with stirring and heating to 100° C. for 5 hours. Distillation is then carried out under a pressure of 2 mm. Hg, and 160 gm. of pentanediol passing over at 170° C. are recovered.

The distillation residue is dissolved in 500 cc. of dry butanol. The solution is stirred and heated to 100° C., and 320 gm. of 1,5-dibromopentane are added. The reaction mixture is heated under reflux for 2 hours, the butyl alcohol is driven off under reduced pressure, and the dibromopentane is driven off under a high vacuum. Boiling point: 68° C./2 mm. Hg.

To the residue there are added 500 gm. of a 48% aqueous solution of HBr and 200 gm. of concentrated sulphuric acid, and the mixture is heated at 100° C. for 6 hours. The reaction medium is then washed with water, then with a dilute solution of $NaHCO_3$, and then again with water, and dried over $CaCl_2$. Distillation is then carried out under a pressure of 1.5 mm. Hg. 143 gm. of excess dibromopentane passing over at about 65° C. are recovered, and then 25 gm. of 5,5'-dibromo-dipentyl ether are collected. Boiling point: 136–137° C./1.5 mm. Hg.

0.1 mole of 5,5'-dibromo-dipentyl ether and 0.4 mole of trimethylamine in a 20% alcoholic solution are heated under reflux for 3 hours. The mixture is then evaporated to dryness and the residue is recrystallized in an alcohol-acetone mixture. Melting point: 155–156° C.

Example 2.—Dichloride of 5,5'-bis(trimethylammonium)-dipentyl ether 5,5'-dichloro-dipentyl ether is prepared from dichloropentane and pentanediol in the manner described in Example 1 for the dibromo derivative, or according to the method indicated by Alexander and Schniepp (Jour. Am. Chem. Soc. 70 (1948) 1841), starting from tetrahydropyrane. 0.1 mole of ether and 100 cc. of a 24% alcoholic solution of trimethylamine are placed in a sealed tube and heated to 100° C. for 12 hours. The excess trimethylamine and the solvent are driven off under reduced pressure. The residue is dissolved in water and the unconverted chlorinated oxide is extracted with ether. The aqueous solution is evaporated to dryness, the residue is dehydrated by being dissolved in an alcohol-benzene mixture, followed by azeotropic distillation and subsequent recrystallization in an alcohol-acetone-ether mixture. The product obtained is very hygroscopic. Melting point: 197–198° C.

Example 3.—Di-iodide of 5,5'-bis(trimethylammonium)-dipentyl ether 5,5'-diiodo-dipentyl ether is prepared by heating under reflux with mechanical stirring a mixture of 0.1 mole of the corresponding dichloro ether and 60 gm. of NaI in 150 cc. of anhydrous ethanol for 6 hours. The reaction mixture is filtered and the alcoholic filtrate is distilled, and 32 gm. of diiodo-ether-oxide are separated. Boiling point: 160–165° C./1.5 mm. Hg. This product is then quaternized in the manner described in Example 1 in connection with the corresponding bromo derivative. The resulting quaternary salt melts at 162–163° C.

The same product could also be prepared according to Example 1 from diiodopentane and pentanediol. It can also be obtained by converting the dichloride or the dibromide of 5,5'-bis(trimethylammonium)-dipentyl ether into diiodide by means of sodium iodide in alcoholic solution.

*Example 4.—Di-iodide of 4,4'-bis(trimethylammonium)-dibutyl ether. Melting point: 170 C.*

4,4'-dichloro-dibutyl ether is first prepared either according to Example 1, or according to the method of Alexander and Schniepp (loc. cit. page 1840) and is converted into the diiodo ether as described in Example 3. The boiling point of the diiodo ether is 152–154° C. at a pressure of 3 mm. Hg. Quaternization is carried out as in Example 1.

*Example 5.—Di-iodide of 6,6'-bis(trimethylammonium)-dihexyl ether*

This compound, which is obtained in the form of extremely hygroscopic crystals, is prepared by treating the corresponding dichloride with sodium iodide in an alcoholic medium. The dichloride of 6,6'-bis(trimethylammonium)-dihexyl ether is obtained according to Example 2 from the known compound 6,6'-dichlorohexyl ether. The dichloride forms a non-crystallizable oil at room temperature.

*Example 6.—Di-iodide of 5,5'-bis(triethylammonium)-dipentyl ether*

This product is obtained by quaternizing 5,5'-diiodo-dipentyl ether prepared according to Example 3 in the manner described in Example 1 using triethylamine in place of trimethylamine.

The resulting quaternary salt, recrystallized in an alcohol-ether mixture, melts at 204° C.

*Example 7.—Diiodide of 5,5'-bis(diethylmethylammonium)-dipentyl ether*

This mixed quaternary salt is prepared by heating a solution of 73.2 gm. of 5,5'-dichloro-dipentyl ether and 91 gm. of anhydrous diethylamine in 150 cc. of benzene to 160° C. in a closed vessel for 8 hours. The diethylamine hydrochloride is filtered, the solvent is driven off and the residue is distilled under a pressure of 0.6 mm. Hg. 72.5 gm. of 5,5'-bis (diethylamino)-dipentyl ether passing over at 140–142° C. are obtained. This tertiary amine is then quaternized by heating under reflux for 2 hours with methyl iodide (50% excess) in an alcoholic medium. After the solvent has been driven off, the residue is recrystallized in an alcohol-ether mixture. The quaternary salt obtained is very hygroscopic and melts at 168° C.

It is also possible to prepare compounds corresponding to the formula set forth above in which the R' group are different by starting from an alpha, omega-alkyldiol and an alpha, omega-dihalogenoalkane of a different number of carbon atoms.

The compounds of this invention may be associated with a carrier, which may be a sterile parenteral liquid, to form compositions to facilitate dosage. Liquid diluents are employed in sterile condition for parenteral use, that is, by injection. Such a medium may be a sterile solvent such as water.

The percentage of active ingredient in such compositions may be varied. It is advantageous that the active ingredient constitute a proportion such that a suitable dosage will be obtained. I have found that the percentage of active agent may be 0.2 percent, or even a minor proportion. The following ampuls formulations are intended to be illustrative only and may be varied or modified to a considerable extent.

FORMULATION I

| | | |
|---|---|---|
| Dichloride of 5,5'-bis(trimethylammonium)-dipentyl ether | mg | 6 |
| Sodium chloride | mg | 25.2 |
| Water, q.s. | cc | 3 |

FORMULATION II

| | | |
|---|---|---|
| Dichloride of 5,5'-bis(trimethylammonium)-dipentyl ether | mg | 1 |
| Glucose | mg | 45 |
| Water, q.s. | cc | 1 |

It will be apparent that various changes and modifications may be made without departing from the scope of the invention as defined in the appended claim and it is intended, therefore, that all matter contained in the foregoing description, particularly in the examples, shall be interpreted as illustrative only and not as limitative of the invention.

This application is a continuation-in-part of my co-pending application Serial No. 353,239, filed May 5, 1953, now abandoned.

What I claim and desire to secure by Letters Patent is:
As a composition of matter, a compound of the formula

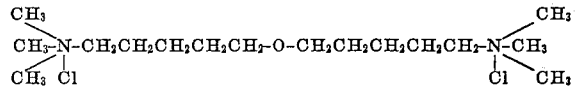

References Cited in the file of this patent
UNITED STATES PATENTS

| | | |
|---|---|---|
| 2,560,280 | Benneville | July 10, 1951 |
| 2,704,299 | Buc | Mar. 15, 1955 |

FOREIGN PATENTS

| | | |
|---|---|---|
| 462,843 | Germany | July 18, 1928 |
| 511,219 | Belgium | May 31, 1952 |
| 738,337 | Great Britain | Oct. 12, 1955 |
| 1,088,180 | France | Mar. 3, 1955 |

OTHER REFERENCES

Ewins, Biochem. J., vol. 8 (1914), pages 368–369.

Marxer et al., Helv. Chim. Acta, vol. 34 (1931), pages 924–931.

Kahane et al., Bull. Soc. Chim., vol. 6 (1939), pages 647–648.

Kunkel et al., Federation Proceedings, vol. 11 (March 1952), page 365.

Morren et al., Chemical Abstracts, vol. 48, page 591 (1954). Abstract of J. Pharm. Belg., vol. 7, pages 295–307 (1952).